United States Patent [19]

Yoshimaru et al.

[11] 4,357,638

[45] Nov. 2, 1982

[54] INDEX INFORMATION RECORDING METHOD FOR PICTURE INFORMATION FILING SYSTEM

[75] Inventors: Tomohisa Yoshimaru; Kazuhiko Iida, both of Yokohama, Japan

[73] Assignee: Tokyo Shibaura Denki Kabushiki Kaisha, Kawasaki, Japan

[21] Appl. No.: 198,468

[22] Filed: Oct. 20, 1980

[30] Foreign Application Priority Data

Oct. 23, 1979 [JP] Japan .................. 54-136642

[51] Int. Cl.³ .............................................. G11B 27/32
[52] U.S. Cl. ...................................... 360/72.2; 360/49
[58] Field of Search ................... 360/72.2, 49, 48, 33; 358/127; 364/200, 900

[56] References Cited

U.S. PATENT DOCUMENTS 3,946,959  3/1974  Sawazaki .................. 242/55.19 A
4,167,028  9/1979  Tobey ........................... 360/72.2

FOREIGN PATENT DOCUMENTS 53-15123  2/1978  Japan .......................... 360/134

Primary Examiner—Alan Faber
Attorney, Agent, or Firm—Cushman, Darby & Cushman

[57] ABSTRACT

In a picture information filing system using an endless magnetic tape (43), which has a plurality of picture information recording tracks ($48_2$) for a plurality of units of recording two-dimensional picture information (3) in predetermined blocks and an index information recording track ($48_1$) for recording index information for the individual unit picture information, the index information is temporarily stored in a random access memory (13) as unit index information groups each consisting of a predetermined number of index information items, recording start index information consisting of a peculiar code and an address representing the position from which to record the next picture information is added to the last index information item in the last index information group, and the individual index information groups are recorded in predetermined blocks of the index information recording track, each index information group in each particular block.

6 Claims, 7 Drawing Figures

INDEX INFORMATION RECORDING METHOD FOR PICTURE INFORMATION FILING SYSTEM

BACKGROUND OF THE INVENTION

This invention relates to an index information recording system for a picture information filing system using a magnetic tape device as picture information memory.

Picture information filing systems have recently been developed, in which picture information of a great deal of documents can be photoelectrically converted through two-dimensional optical scanning and then stored in a large capacity picture information memory so that it can be searched for and reproduced for recording or display as two-dimensional visible image when required. As the large capacity picture information memory which is used with such a picture information filing system for memorizing picture information, magnetic tape devices have recently been contemplated. An example of such device is disclosed in U.S. Pat. No. 3,946,959 which is applied by the same applicant.

In this magnetic tape device, an endless magnetic tape having a number of recording tracks extending in the direction of its running is moved at a high speed for recording picture information (video signal) obtained from picture information of a document or the like through two-dimensional optical scanning on the tape with a magnetic head for unit quantity (i.e., for one page) after another or searching for and reproducing recorded picture information. At this time, recording tracks are selected by moving the head in a direction perpendicular to the direction of running of the tape.

In such magnetic tape device, index information for each unit quantity of the picture information is also recorded together therewith, and this index information is used as searching code at the time of searching for desired picture information. Doing so makes it possible to obtain better operation control. To this end, it is thought to use at least one of the recording tracks as index recording track in which to record the index information of the picture information recorded in other tracks which serve as picture information recording tracks. However, in case where the index information is merely successively recorded in the index recording track, at the time when searching for the index information the running speed of the tape, which is being moved at a high constant speed, cannot be sufficiently followed, and sometimes it happens that some index information fails to be decoded. More particularly, since the running speed of the tape is very high compared to the decoding period involved in the searching for index information, failure of decoding of some items of index information is prone, that is, the running speed of the tape is so high compared to the decoding period for searching index information that it is likely that a portion of the tape corresponding to the next item of index information comes to the head during the decoding of an item of index information. Another deficiency occurs at the time when adding index information of newly recorded picture information. While the new index information is additionally recorded by detecting the last index information that has already been recorded, because of its very high running speed the tape is moved a considerable distance from the detection of the last index information till the commencement of recording of the new index information. Therefore, a considerable gap is produced between adjacent items of index information which are recorded one after another, that is, the individual items of index information are recorded in a discontinuous fashion.

SUMMARY OF THE INVENTION

An object of the invention is to provide an index information recording system, with which it is possible to sufficiently follow the high speed of movement of the recording medium at the time when recording or searching for index information and also prevent discontinuous recording of the index information, and also which permits the recording start position (i.e., block number and track number) from which to record new picture information for the next time to be readily known.

To achieve the above object, according to the invention in a system, in which given picture information is recorded on or reproduced from a moving recording medium, which has a plurality of picture information recording tracks for recording a plurality of units of picture information in preset blocks and at least one index recording track for recording index information items corresponding to the respective unit quantities of picture information, these tracks extending in the direction of running of the medium, with a given picture information recording track selected by moving a recording/reproducing head in a direction perpendicular to the direction of running of the tape, the index information is recorded by a method comprising a step of temporarily memorizing the index information in a memory means in unit index information groups each consisting of a predetermined number of index information items, a step of adding recording start index information consisting of a peculiar code and an address representing the position from which to record the next picture information to the last index information item in the last index information group in the memory means, and a step of recording the individual index information groups in predetermined blocks of the index information recording track each index information group in each particular block.

Other objects and features of the present invention will become apparent from the following description taken in connection with the accompanying drawings, in which:

DETAILED DESCRIPTION OF THE PREFERRED EMBODIMENT

Figure 1:
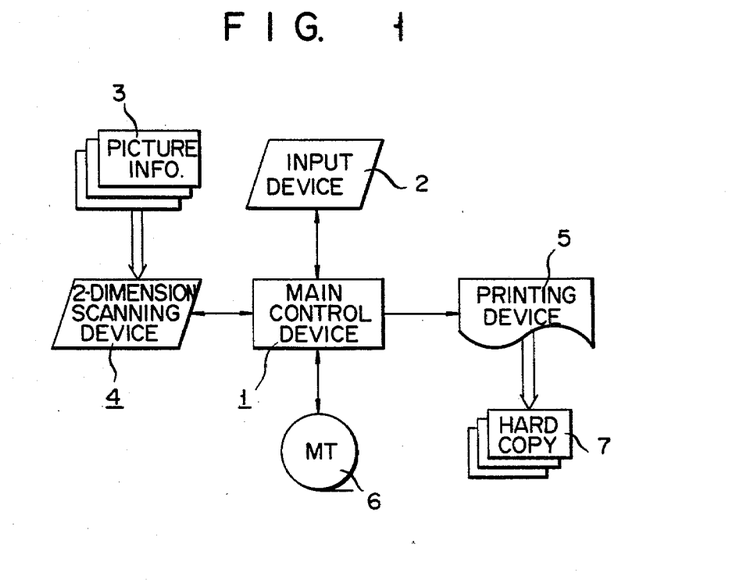
FIG. 1 is a block diagram showing the schematic construction of a picture information filing system incorporating the invention.

FIG. 1 is a block diagram showing the schematic construction of a picture information filing system, to which the invention is applied.

A main control unit 1 effects compiling operations such as recording, reproduction, addition, insertion and deletion of picture information and index information which may be provided as input information from an input device 2 having a display function such as a keyboard display. Picture information 3 of a document or the like is photoelectrically converted through two-dimensional optical scanning in a two-dimensional scanning device 4, and the resultant picture information (video signal) is supplied through the main control device 1 to a printing device 5 or a magnetic tape device 6. The printing device 5 receives the picture information from the two-dimensional scanning device 4 or reproduced picture information from the magnetic tape device 6 and produces therefrom two-dimensional visible images as hard copies 7.

Figure 2:
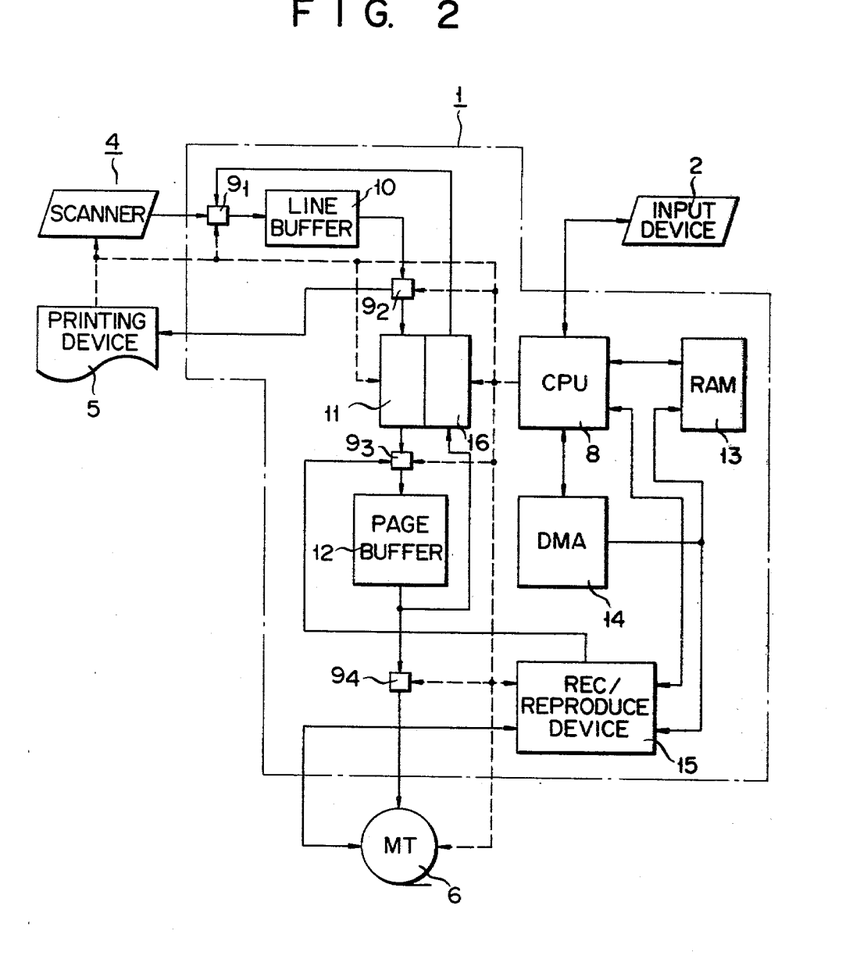
FIG. 2 is a block diagram showing the picture information filing system of FIG. 1 in detail.

FIG. 2 shows a block diagram showing the main control device shown in FIG. 1 in detail. In the Figure, solid lines indicate the flow of data, and dashed lines indicate the flow control signal.

Referring to FIG. 2, the two-dimensional scanning device 4 is connected through a first selector $9_1$ to a line buffer 10. In the two-dimensional scanning device 4, the picture information 3 of a document or the like set there is photoelectrically converted through two-dimensional scanning with a laser beam. The line buffer 10 memorizes the photoelectrically converted picture information for each scanning line. It is connected through a second selector $9_2$ to a compressing circuit 11. The compressing circuit 11 is provided for compressing the input picture information. If picture information of a unit quantity (i.e., for one page) is to be directly memorized, a memory of a very large capacity is required. However, the picture information often contains very much redundancy, so that it is compressed (i.e., its redundancy is reduced) for memorizing it. As the method of compression, bandwidth compression, for instance through the well-known modified Hoffman conversion, is made. The modified Hoffman conversion is a technique used for data compression and adopted as standard technique in the facsimile field by the CCITT (International Telegraph and Telephone Consultation Committee). It is a one-dimensional run-length coding technique (using a one-dimensional run-length coding system), in which the longest run-length or one line is constituted by 1,728 bits (corresponding to the short side of the A-4 size). Particular codes are provided for bit numbers of white run-lengths (overall length of continuous white bits) and also for those of black run-lengths (overall length of continuous black bits). For example, a code "10011" corresponds to a white run-length of "8" (i.e., eight continuous white bits), and a code "0011" is provided for a black run-length of "5" (i.e., five continuous black run-lengths). As the document is scanned by the scanner, white and black data are alternately obtained as a natural result, and the bit numbers of these data are counted for coding the data according to the counted bit numbers. The modified Hoffman conversion permits data compression of the document information to about one-eighth. The compressed line information is supplied through a third selector $9_3$ to a page buffer 12. The page buffer 12 successively memorizes picture information as unit information, i.e., for one page. It is connected through a fourth selector $9_4$ to the magnetic tape device 6, so that its picture information output is recorded therein for each unit.

The recording of data in the tape device 6 and reading of data therefrom are effected by a record/reproduce circuit 15. To the record/reproduce circuit 15 is also connected a direct memory access (DMA) 14, which has a function of reading out data of the magnetic tape device 6 and transferring the read-out data directly to a random access memory (RAM) 13 without agency of a central processing unit (CPU) 8. Input device 2, RAM 13, DMA 14, record/reproduce circuit 15, signal compressing circuit 11, signal expanding circuit 16, magnetic tape device 6, two-dimensional scanning device 4, output device 5 and selectors $9_1$ through $9_4$ are all connected to the CPU 8 and controlled thereby. The signal expanding circuit 16 expands the compressed picture information read out of the magnetic tape device 6, the method of expansion being also based upon the aforementioned modified Hoffman conversion.

Figure 3:
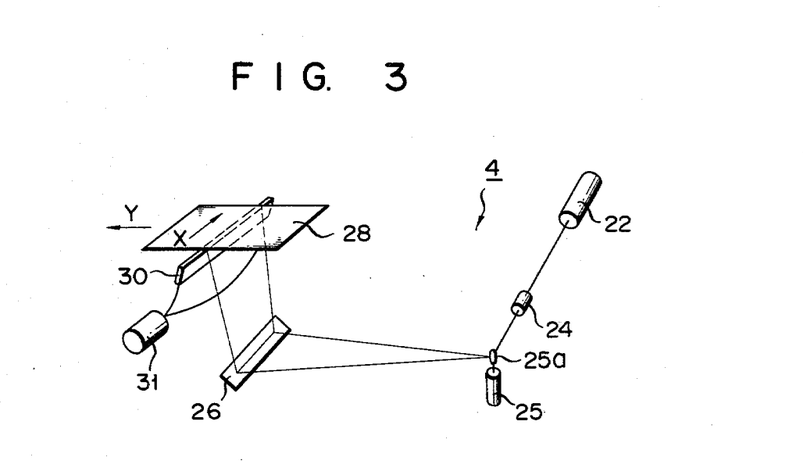
FIG. 3 is a schematic view showing a two-dimensional scanning device shown in FIG. 2.

FIG. 3 shows the detailed construction of the two-dimensional scanning device 4. In the Figure, the two-dimensional scanning device 4 includes a laser oscillation tube 22, an optical system 24 having various lenses for focusing the incident laser beam and an optical scanning 25 disposed in the light path of the laser beam issuing from the laser oscillation tube 22. The optical system 24 is constructed with a group of focusing lenses for focusing the incident laser beam on the surface of original 28.

The optical scanner 25 is constructed as a galvano-mirror system having a movable mirror 25a, which is adapted to reflect the incident laser beam in such a manner as to convert the incident laser beam into a linear scanning beam. A rocking mirror 26 rotatable about a horizontal axis is provided on the forward side of the two-dimensional scanning device 4. It extends horizontally and has a rectangular shape. The original 28 is disposed above the rocking mirror 26. The linear scanner laser beam from the optical scanner 25 is incident on and reflected by the rocking mirror 26. The reflected laser beam scans the surface of the original 28 when the rocking mirror 26 is in its position directed obliquely upwards, (i.e., a reading position). Since the original 28 is horizontally disposed, it is movable in a direction of making rightward angles with respect to a direction normal to the rocking mirror 26 (for instance in a Y-direction if the direction normal to the rocking mirror 26 is an X-direction). A light sensor means 30 is disposed beneath the original 28 and receives light reflected therefrom. A photoelectric converter 31, to which the light sensor means 30 is connected, converts light received by the light sensor means 30 into an electric signal according to the intensity of the received light. Each light sensor 30 may be constructed with a number of optical fibers arranged in a row extending in the longitudinal direction (i.e., X-direction) of the original 28, with the individual optical fibers in contact with the surface of the original 28 and the other end optically shielded and coupled to the photoelectric converter 31. The photoelectric converter 31 may be constructed with a photo-multiplier or a photo-diode.

Figure 4:
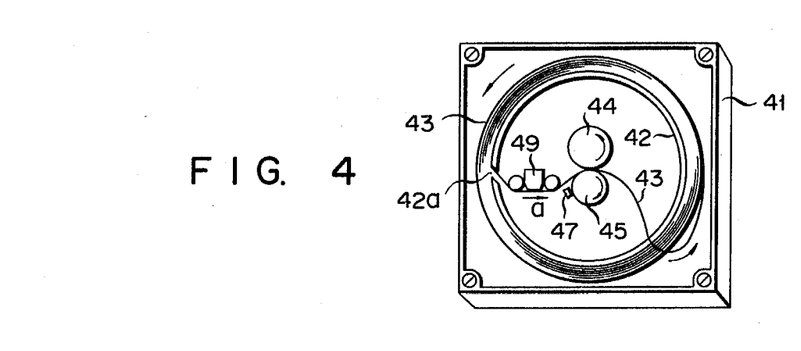
FIG. 4 is a view schematically showing a cassette tape and a tape feed mechanism in a magnetic tape device.
Figure 5:
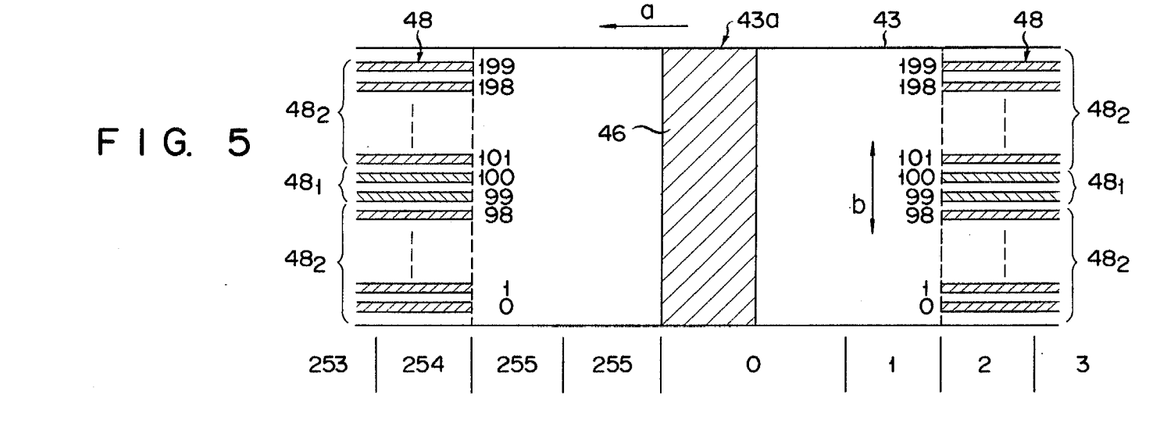
FIG. 5 is a format of a magnetic tape, showing tracks and blocks.

FIG. 4 schematically shows a cassette tape and a tape feed mechanism section of the magnetic tape device 6. Within a case 41 a stationary reel 42 is provided, and an endless magnetic tape 43, for instance having a width of ½ inch (about 12.7 mm) and a length of about 36 m, is wound on the reel 42. When the cassette tape of this construction is loaded, a portion of the tape 43 constituting the innermost turn thereof wound on the reel 42 is pulled out through a window 42a formed in the reel 42 and fed out by a capstan 44 and a pinch roller 45 at a high speed (about 5 m/sec.) in the direction of arrow a in the Figure to be re-wound as the outermost turn of the tape 43. The tape 43 is thus caused to complete one excursion in about 7.2 seconds. One excursion of the tape 43 is confirmed when a tape mark 46 such as a silver foil applied to the seam of the endless tape 43, as shown in FIG. 5, is optically detected by a mark detector 47. The output signal of the detector 47 is also used as a reference for detecting blocks in the tape 43 (to be described hereinafter). As shown in FIG. 5, on the tape 43 two hundred parallel recording tracks 48 are set to extent in the running direction a of the tape (with a track width of about 40 μm and an intertrack pitch of about 52 μm). The recording tracks 48 are given respective track numbers "0", "1", . . . , "199" from the lowermost track in the Figure. Of these tracks, practically central two (with track numbers "99" and "100", the track "99" being a spare track) are index recording tracks $48_1$ for recording index information for corresponding unit picture information (the index information consisting of index code and recording address, which consists of track number and block number), while the other one hundred and ninety-eight tracks (with track numbers "0" through "98" and "101" through "199") are picture information recording tracks $48_2$ for recording picture information. Each of the recording tracks 48 is divided into two hundred and fifty-six blocks, which are given successive block numbers "0", "1", . . . , "255" with the tape mark 46 as reference. The recording of information on or reproduction thereof from the magnetic tape 43 is made by selecting a given recording track 48 with reciprocal movement of a recording/reproducing head 49 (a two-gap magnetic head having an erasing function) provided in the neighborhood of the capstan 44, the movement being caused by a head access mechanism (not shown) in directions b perpendicular to the running direction a.

Figure 6:
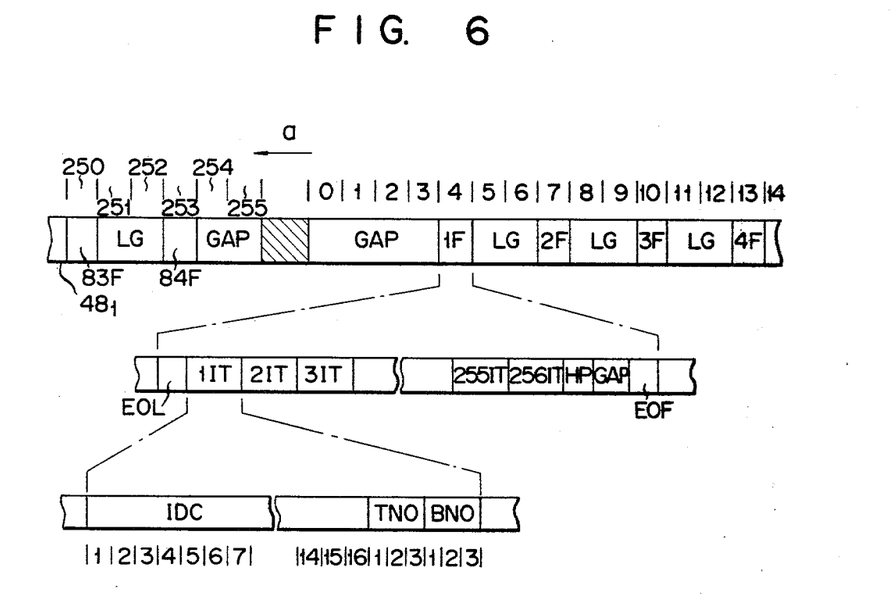
FIG. 6 is a format with a detailed showing of a recording format of an index recording track.

FIG. 6 shows the recording format of the index recording track $48_1$. Here, of two hundred and fifty-six blocks, every but two blocks from the fourth block, i.e., the 4-th, 7-th, 10-th, 13-th and so forth block, are used for recording the index information. These blocks are respectively called 1-st frame (1F), 2-nd frame (2F), 3-rd frame (3F), 4-th frame (4F) and so forth. The two blocks between adjacent frames constitute an ineffective information area (LG) for searching for index information to be described hereinafter. While in the instant embodiment the ineffective information areas are mere gaps where nothing is recorded, it is possible to record dummy information in these areas. Each of the frames consists of a frame start code (EOL), 1-st to 256-th items (IT), a horizontal parity check code (HP), a recording gap (GAP) and a frame end code (EOF). Each of the items consists of an index code (IDC), which consists of an Arabic figure symbol constituted by sixteen figures at the most, a track number (TNO) of the track in which the picture information having that index code name is recorded, and a block number (BNO) of the first one of the blocks in which that picture information is recorded. In this embodiment, two hundred and fifty-six items of index information are recorded as a unit index information group in one frame.

Figure 7:
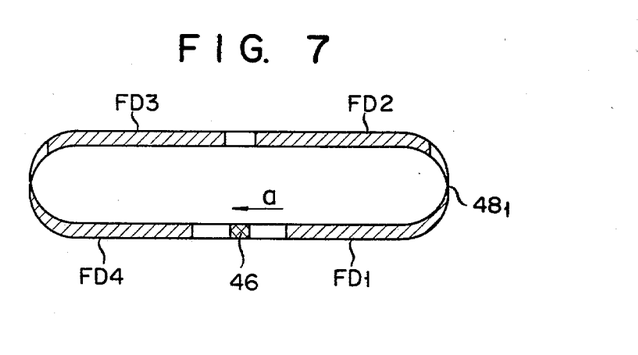
FIG. 7 is a view showing a recording format of the index recording track with respect to one excursion of the magnetic tape.

In the index code section of the item next to the last index information item a special code or special codes are recorded. Further in the track number (TNO) section and the block number (BNO) section of said item there is recorded a recording start index information which represents the serial number of a start block in which the next picture information will be recorded. In this case, the block number recorded in the block number section of said item is identical with the serial number of the start block. The recording start index information need not be recorded in the track number section and the block number section if there recorded in the block number section of the last index information item the serial number of the start block in which the immediately preceding picture information is recorded and the number of blocks which have been used to record one page of picture information. This is because the record start index information can be obtained by adding the serial number of the start block and the number of blocks both recorded in the block number section of the last index information item. The arabic figure symbol in the index code consists of seven unit codes and a vertical parity check code, and the track number and block number individually consist of seven unit codes of figures and a vertical parity check code of one bit. In the index information recording track $48_1$, index information of entirely the same content is recorded several times for the purposes of reducing the period for searching for index information and also eliminating adverse effects of drop-out and so forth. For example, the same index information is recorded for every twenty-one frames, that is, four times with one excursion of the tape 43, as shown in FIG. 7. In this case, the same index information is recorded in regions FD1 to FD4, with the region FD1 beginning with the 1-st frame, the region FD2 with the 22-nd frame, the region FD3 with 43-rd frame and the region FD4 with the 64-th frame. The regions FD1 through FD4 are individually called file information groups, which consists of all the index information for the picture information capable of being recorded on one tape 43.

Now, the ways in which picture information is stored and searched for will now be described in detail with reference to FIGS. 1 and 2. The method of storing picture information will now be described. When a store instruction and an index code consisting of sixteen or less bits representing the name of the picture information to be stored are coupled to the CPU 8, the CPU 8 renders the two-dimensional scanning device 4 and magnetic tape device 6 operative. The two-dimensional scanning device 4 photoelectrically converts picture information of a document or the like set in it through laser beam scanning of the picture information. The photoelectrically converted picture information is stored for each of the successive scanning lines in the line buffer 10 through the selector $9_1$. The successive lines of picture information, which are memorized one after another in the line buffer 10, are then successively supplied, after modified Hoffman conversion through the signal compressing circuit 11, through the selector $9_3$ to the page buffer 12 and memorized therein. When one unit quantity of picture information is entirely memorized in the page buffer 12, the CPU 8 moves the head 49 up to a position corresponding to a picture information recording track $48_2$ in which to record the new picture information, and it also permits the picture information stored in the page buffer 12 to be coupled for one scanning line after another through the selector $9_4$ to the magnetic tape device 6, i.e., to the head 49. Thus, the new picture information is recorded in the specified blocks, the first one of these blocks being two blocks (constituting ineffective information area (LG)) after the last block in which picture information is already recorded.

When the picture information of one unit quantity is entirely recorded, the CPU 8 reads out the content of a block counter (not shown) at this instant and checks whether or not the value read out is smaller than the block number "254" of the block, which is the last block available in the track for recording information. The block counter is provided in the CPU 8, and it is cleared by the output of the mark detector 47 and counts up clock pulses (with a period of about 28 μm), which are produced in synchronism to the running of the tape 43, from "0" up to "255" as the tape 43 executes one excursion. When the checked value of the block counter is smaller than "254", "3" is added to this value of the counter content, i.e., the corresponding block number (this being done for there are three blocks from the leading end of each frame to the leading end of the next one), and the resultant value is memorized together with the relevant track number in the RAM 13, which serves as an index searching memory. When the checked value of the block counter is equal to "254", "2" is memorized as block number together with the sum of the relevant track number and "1" in the RAM 13. In this way, the recording start address (i.e., track number and block number) from which to record new picture information in the next recording is memorized. In case when the recording of picture information of one unit quantity is not ended while the content of the block counter becomes "254", that is, while the last block (with block number "254") in a picture information recording track $48_2$ is passing by the head in recording, the CPU 8 temporarily stops the recording at this instant and shifts the head 49 to the next picture information recording track $48_2$ for recording the remaining picture information therein. In this case, when the recording is entirely ended the recording start address is memorized in the RAM 13 in the manner as described above. At this time, the CPU 8 displays the track number and block number of the recording start address on a display section of the input device 2, so that the operator can know the remaining picture information recording tracks and blocks that can be used. To let the block of a picture information recording track, from which to record the new picture information, be known, the recording start index information added after the last index information recorded in the index information recording track $48_1$, i.e., the track number (TNO) and block number (BNO) in the last one of the items (IT), in which peculiar codes other than Arabic figure symbols are recorded in index code sections (IDC), may be detected by causing the head 49 to read out the index information recording track $48_1$ immediately after the start of running of the tape 43 in the magnetic tape device 6, and the read-out information may be memorized in the RAM 13. Thus, when the recording of new picture information is ended, the index information thereof is recorded in the index information recording track $48_1$ with the head 49 moved to the position corresponding to the track $48_1$ by the CPU 8. For example, when the new picture information is recorded for the 356-th unit (this being capable of being known by checking immediately after the start of running of the tape 43 which item in which frame is an item containing a peculiar code, for instance a mark ©), the index code, track number and block number of the newly recorded picture information may be recorded in the 100-th item (100IT) in the 2-nd frame (2F) in the filing information group FD1, the 100-th item (100IT) in the 23-rd frame (23F) in the filing information group FD2, the 100-th item (100IT) in the 44-th frame (44F) in the filing information group FD3 and the 100-th item (100IT) in the 65-th frame (65F) in the filing information group FD4, i.e., a total of four times. However, with index information already recorded in the items up to the 99-th item (99IT) in the second frames (2F, 23F, 44F, 65F) in the individual filing information groups FD1 through FD4, it is very difficult to additionally record the new index information in a continuous fashion. This is because of the fact that the tape 43 is running at a high speed as mentioned earlier so that a gap is likely to be formed between the 99-th and 100-th items. In the instant embodiment, the recording is made through the following processing.

When the ineffective information area (LG) between first and second frames of the filing information group FD1 has passed by the head 49, the CPU 8 gives a one frame transfer command to the DMA 14. In consequence, the DMA 14 gives a reproduce command to the record/reproduce circuit 15 so that the circuit 15 receives reproduced signal from the head 49. When a frame start code (EOL) is detected by the record/reproduce circuit 15, the DMA 14 temporarily rendered the CPU 8 inoperative and lets the reproduced signal received by the record/reproduce circuit 15, i.e., the index information group of the second frame, to be directly memorized in a specified area of the RAM 13. When the frame end code (EOF) is detected by the record/reproduce circuit 15, the DMA 14 is rendered inoperative. Thereupon, the CPU 8 is rendered operative again, and when it detects a peculiar code memorized in an area of the RAM 13 corresponding to 100-th item, it revises the recording start index information including that peculiar code by writing the index information for the new picture information, i.e., the index code (IDC), track number (TNO) and block number (BNO) thereof. When this process is ended, the CPU 8 writes recording start index information consisting of a peculiar code and a recording start address (track number and block number), from which the next picture information is to be recorded, in an area of the RAM 13 corresponding to the 101-st item. When this process is ended, the CPU 8 gives an erase command to the record/reproduce circuit 15 and also gives a one frame reverse transfer command to the DMA 14. Consequently, the head erases the record content in the second frames (2F, 23F, 44F and 65F) in the filing information groups FD1 through FD4 and also records the new index information group for one frame, which has been re-compiled in the RAM 13, through the record/reproduce circuit 15 on the tape successively in the 2-nd frame of the file information group FD1, 23-rd frame of the filing information group FD2, the 44-th frame of the filing information group FD3 and the 65-th frame of the filing information group FD4. In this way, the storage of the unit picture information and registration of the index information thereof are effected.

Now, the searching for and reproduction of picture information recorded and filed in the above way will be described. When a searching command and the index code of the required picture information are coupled from the input device 2, the CPU 8 moves the tape 43 while moving the head 49 to the position corresponding to the index recording track 48₁ to start reproduction of the content in the track 48₁. When the third block (block number "3"), for instance, of the tape 43 is passing by the head 49, the CPU 8 gives a one frame transfer command to the DMA 14. Thus, the DMA 14 gives a reproduce command to the record/reproduce circuit 15, so that the circuit 15 receives the reproduced signal from the head 49. When the frame start code (EOL) is detected by the record/reproduce circuit 15, the DMA 14 temporarily renders the CPU 8 inoperative so that the reproduced signal received by the record/reproduce circuit 15, i.e., the index information group for the first frame, may be directly memorized in a specified area of the RAM 13. When the frame end code (EOF) is detected by the record/reproduce circuit 15, the DMA 14 is rendered inoperative. Thereupon, the CPU 8 is rendered operative again and collates the successive items of the index information group of the first frame transferred to the RAM 13 with the coupled index code to find out an index code identical therewith for the required picture information. During this time, the ineffective information area (LG) between the first and second frames is passing by the head 49.

If most of the index codes in the first frame differ from the coupled index code for the required picture information within the first five characters, the searching for the index code with respect to the first frame is ended in a very short period of time.

In such a case, the CPU 8 gives another one frame transfer command to the DMA 14 after confirming that the content of the block counter is less than "7" (representing the sixth or younger block), i.e., that the second frame has not yet come to the head 49. Thus, the index information group in the second frame is memorized in the RAM 13 in the same manner as for the first frame described above, and then the CPU 8 starts again to search for the index code. If in this case most of the index codes coincide with the coupled index code up to the first fourteen characters and different in the last two characters and the identical index code with the coupled one is not found, the searching for the index code with respect to this frame, i.e., the second frame, takes a very long period of time. If the searching with respect to this frame is so long that during this time the third and fourth frames pass by the head and the fourteenth block, for instance, is at the head at the instant when the searching for this frame is ended, the CPU 8 reads out the content of the block counter (being "14" at this time) and memorizes that the third and fourth frames are failed to be searched over. In the above way, the searching operation is continued over following frames until the identical index code with the coupled one is found.

In case when the searching for the index code identical with the coupled one proceeds in vain until the item containing the peculiar code in the portion corresponding to the index code is ended, no further index information is recorded in the filing information group FD1. Consequently, the CPU 8 ends the searching with respect to this filing information group and makes searching afresh with respect to the frames that are missed in the previous searching. More particularly, after the passage of the gap between the filing information groups FD1 and FD2 by the head 49, the CPU 8 starts searching with respect to the third and fourth frames in the filing information group FD2, i.e., 24-th and 25th frames in the tape.

In case when the 24-th frame contains many codes very close to the coupled index code so that the searching with respect to this frame takes a long time and is ended only after the 25-th frame has passed by the head 49, the CPU 8 starts searching afresh from the fourth frame in the next filing information group FD3, i.e., from the 46-th frame.

If the identical index code with the coupled one for the required picture information is found in this searching, the CPU 8 reads out the track number (TNO) and block number (BNO) following this index code (IDC) from the index information group (of the 46-th frame in this case) in the RAM 13 and memorizes these read-out data again in a specified area of the RAM 13. Then, the CPU 8 moves the head 49 to a position corresponding to the picture information track 48₂ of the memorized track number and causes reproduction of this track. At this time, the block counter is operative, and when the counter content comes to coincidence with the memorized block number the CPU 8 causes the reproduced signal, i.e., picture information, from that instant to be coupled through the record/reproduce circuit 15 and selector 9₃ to the page buffer 12. When the unit picture information is entirely stored in the page buffer 12, the CPU 8 causes this picture information (which is the compressed information) to be supplied one scanning line after another to the signal expanding circuit 16 for expansion by the modified Hoffman conversion to recover the original picture information, which is coupled one line after another through the selector 9₁ to the line buffer 10. The line information coupled to the line buffer 10 for one line after another is successively coupled as serial information through the selector 9₂ to the printing device 5 in synchronism to the recording timing of the printing device 5. Thus, the printing device 5 produces the reproduced picture information as a hard copy 7.

As has been shown, a predetermined number of index information items are temporarily memorized as a unit index information group in the RAM 13 serving as a memory means. Also, as the recording start index information what consists of a peculiar code and an address of a position from which to record the next picture information is added after the end of the last index information group, and these index information groups are successively recorded in the index information recording track 48₁ each group in each block. For adding new index information to the index information group, which contains the aforementioned recording start index information containing the peculiar code, this index information group is entirely reproduced from the index information recording track 48₁ and temporarily stored in the RAM 13, and a new index information group is compiled in the RAM 13 by replacing the recording start index information with the new index information and adding new recording start index information consisting of the aforementioned peculiar code and an address representing the track number and block number from which to record the next picture information. The block, in which the index information group having previously been memorized in the RAM 13, is erased, and the new index information group re-compiled in the RAM 13 and containing the new recording start index information is recorded. Thus, it is possible to sufficiently follow up the running of the tape 43 being moved at a high speed at the time when recording or searching for index information. In addition, a preset constant gap may be provided between adjacent index codes, so that it is possible to prevent recording of the index information group in a discontinuous fashion and increase the quantity of index information to be recorded. Further, through the detection of the peculiar code contained in the recording start index information added to the last index information group, the position from which to record the next picture information, i.e., the recording start address consisting of track number and block number, can be readily known. Furthermore, if these data are displayed in the display section of the input device 2, the remaining picture information recording tracks and blocks can be readily known.

While the above embodiment has concerned with a magnetic tape device for recording and reproducing picture information of documents or the like along with the picture information filing system, the invention may also be applied to magnetic tape devices for recording and/or reproducing other information. Also, while the magnetic tape device described has used an endless magnetic tape as recording medium, similar effects may also be obtained with other information recording devices of other types such as a magnetic tape device using not endless but orginary magnetic tape or a magnetic disc device using a magnetic disc as recording medium or an optical disc device using light as recording medium.

What we claim is:

1. In a system in which given information is recorded on or reproduced from a recording medium, which has a plurality of information recording tracks having a plurality of information recording blocks and at least one index recording track for recording index information peculiar to corresponding information other than the index information, these tracks extending in the direction of running of said recording medium, by moving said recording medium and moving a recording/reproducing head in a direction perpendicular to the direction of movement of said recording medium to a position corresponding to a selected information recording track, a method of recording index information comprising the steps of:

temporarily memorizing said index information in a memory means in unit index information groups each consisting of a predetermined number of index information items;

adding a peculiar code to the last index information item in the last index information group in said memory means, said peculiar code being given only in the last index information group; and recording said individual index information groups in predetermined blocks of said index information recording track, each index information group in each particular block.

2. In a system in which given information is recorded on or reproduced from a recording medium, which has a plurality of information recording tracks having a plurality of information recording blocks and at least one index recording track for recording index information peculiar to corresponding information other than the index information, these tracks extending in the direction of running of said recording medium, by moving said recording medium and moving a recording/reproducing head in a direction perpendicular to the direction of movement of said recording medium to a position corresponding to a selected information recording track, a method of recording index information comprising the steps of:

temporarily memorizing said index information in a memory means in unit index information groups each consisting of a predetermined number of index information items;

adding recording start index information consisting of a peculiar code and an address representing the position from which to record the next information to the last index information item in the last index information group in said memory means, said peculiar code being given only in the last index information group; and recording said individual index information groups in predetermined blocks of said index information recording track, each index information group in each particular block.

3. The method of recording index information according to claim 1 or 2, wherein said recording medium is an endless magnetic tape.

4. The method of recording index information according to claim 2, further comprising adding new index information to index information groups already recorded in accordance with the following method steps:

reproducing all the index information group with said added recording start index information containing said peculiar code from said index recording track and temporarily memorizing the read-out index information group in said memory means;

replacing said recording start index information with new index information in said memory means;

adding recording start index information consisting of said peculiar code and an address of the position from which to record the next information, said position being represented by a block number and a track number, after said new index information; and recording the index information group containing said newly added recording start index information in a corresponding block of said index recording track.

5. The method of recording index information according to claim 4, wherein said block number and track number constituting said address are respectively the sum of a number assigned to the last one of blocks in which information corresponding to said new index information is recorded and a predetermined number and a number assigned to the information recording track in which said information corresponding to said new index information is recorded.

6. The method of recording index information according to claim 4, wherein in case when the last one of the blocks in which said information corresponding to said new index information is recorded is the last block of that information recording block said block number and track number constituting said address are respectively a number assigned to the first block available for recording in each of the information recording tracks and the sum of a number assigned to the information recording track in which said information corresponding to said new index information is recorded and a predetermined number.

* * * * *